United States Patent
LeMasters

(10) Patent No.: US 9,275,229 B2
(45) Date of Patent: Mar. 1, 2016

(54) SYSTEM TO BYPASS A COMPROMISED MASS STORAGE DEVICE DRIVER STACK AND METHOD THEREOF

(75) Inventor: Aaron LeMasters, New York, NY (US)

(73) Assignee: MANDIANT, LLC, Milpitas, CA (US)

(*) Notice: Subject to any disclaimer, the term of this patent is extended or adjusted under 35 U.S.C. 154(b) by 40 days.

(21) Appl. No.: 13/421,843

(22) Filed: Mar. 15, 2012

(65) Prior Publication Data

US 2013/0247186 A1 Sep. 19, 2013

(51) Int. Cl.
G06F 11/00 (2006.01)
G06F 21/57 (2013.01)

(52) U.S. Cl.
CPC .................... *G06F 21/572* (2013.01)

(58) Field of Classification Search
CPC .................................................. G06F 21/572
See application file for complete search history.

(56) References Cited

U.S. PATENT DOCUMENTS

| 7,296,271 | B1* | 11/2007 | Chalmer et al. ............... 718/108 |
| 7,958,558 | B1* | 6/2011 | Leake et al. .................... 726/23 |
| 8,099,596 | B1 | 1/2012 | Rusakov et al. |
| 2004/0117610 | A1 | 6/2004 | Hensley |
| 2004/0133890 | A1* | 7/2004 | Fukuda ......................... 718/100 |
| 2006/0143534 | A1 | 6/2006 | Dall |
| 2007/0006226 | A1 | 1/2007 | Hendel |
| 2007/0112677 | A1* | 5/2007 | Witt et al. ...................... 705/50 |
| 2008/0098156 | A1 | 4/2008 | Shen et al. |
| 2011/0219345 | A1* | 9/2011 | Nodine ......................... 716/107 |
| 2011/0276569 | A1* | 11/2011 | Kanefsky ....................... 707/736 |
| 2011/0296440 | A1* | 12/2011 | Laurich et al. ................ 719/326 |
| 2012/0110344 | A1* | 5/2012 | Sadovsky et al. ............. 713/189 |
| 2013/0132699 | A1* | 5/2013 | Vaishampayan et al. ..... 711/170 |

* cited by examiner

*Primary Examiner* — Nirav B Patel
*Assistant Examiner* — Mohammed Waliullah
(74) *Attorney, Agent, or Firm* — Polsinelli PC; Adam C. Rehm

(57) ABSTRACT

A method to circumvent malicious software via a system configured to bypass a device driver stack and, consequently, also bypass the malicious software that may be adversely affecting the device driver stack by using an alternative stack such as a crash dump I/O stack. The crash dump I/O stack is poorly documented relative to the device driver stack and functions independently from the device driver stack.

27 Claims, 5 Drawing Sheets

SYSTEM TO BYPASS A COMPROMISED MASS STORAGE DEVICE DRIVER STACK AND METHOD THEREOF

BACKGROUND

1. Field

The present inventive concept pertains to a system and method to command physical hardware of a computer system. The present inventive concept more particularly concerns an improved system and method to bypass a potentially compromised chain of trust internal to a normal or standard device driver input/out ("I/O") stack, and utilize the crash dump driver stack to control a physical hardware device.

2. Discussion of Related Art

Information security forensic investigators seek to obtain uncontaminated evidence or data from compromised computing devices. Investigators use forensic tools that rely on facilities provided by operating systems to acquire the evidence. At the lowest level, such facilities may include the kernel, the I/O subsystem, and various device drivers for interacting with disk drives, network cards and other peripheral hardware, which are implemented in the operating system ("OS").

A driver translates information from a generic interface to a more specific form suited for hardware, firmware, or software functionalities. Drivers and the OS allow applications to operate without concern for the details of underlying hardware. For example, when an application writes a file to disk, it does so without regard to the underlying technologies, that is, the OS and drivers provide an abstract representation of a mass storage device that obscures the low-level differences between various types of mass storage technology. Abstraction is also used within the OS, for example, when an application calls upon "save data" functionality provided by the OS. Save data functionality will be accessed through drivers provided by the device manufacturer.

Using an example of a mass storage device, the use of abstraction means an application does not need to know if the mass storage device has a magnetic read-write head or uses flash memory chips. In general, an OS has a published specification documenting how it will communicate with different classes of physical hardware devices: mass storage devices, routers, printers, and other similar devices. Manufacturers who want their peripheral devices to work with the OS are responsible for providing a low-level driver for the device. The key advantage of the device driver structure of communication and control is that high-level software components can treat all devices of a given driver class as a single, generic device.

Stacks are chains of software and/or hardware computer components that translate an application request such as "save data" to physical actions such as writing data to a disk platter or memory chip. Device driver stacks may comprise several layers, from low-level hardware-specific drivers provided by device manufacturers, to high-level drivers that translate information for communication with a plurality of disparate components. Implicit in the use of stacks is a chain of trust, where each layer of the stack trusts that the layers above and below it will conform to certain standards and expectations and that data will not be maliciously modified within any layer of the stack.

In FIG. 1, an example of a stack is illustrated in communication with an application 108, and includes an application program interface 110 and a kernel space 104 which includes a number of drivers such as the miniport driver 120, port driver 122, and bus driver 124. In this example, the application 108 in user space 102 uses facilities provided in the kernel space 104 to communicate or control a physical hardware device 128, such as a mass storage device, in hardware layer 106.

Many investigatory and forensic tools used by various investigators rely on standard OS components such as those illustrated in FIG. 1 to perform data collection and analysis. However, well-crafted malicious software such as viruses or malware in a compromised computing device can subvert these components by providing or causing the return of false and misleading data, thereby thwarting the efforts of the investigator. For example, such malicious software can be embedded in a device driver stack to allow an attacker to modify data streams and to inject false data, conceal evidence of system compromises, receive command control instructions, and maintain control of the host computing device.

Malicious software that modifies the Master Boot Record ("MBR"), which is software that enables the computing device to boot from a mass storage device, will often inject code that intercepts requests to read data from the MBR. When an investigator tries to examine the MBR through OS components such as the device's driver stack, the malicious software will often substitute innocuous MBR data in place of obviously-compromised data in an attempt to fool the investigator. "Whitewashing" of the Master Boot Record, for example, can prevent conventional investigation tools from detecting that the MBR is compromised. "Whitewashing," as used herein, means to remove data indicative of a compromise, for instance, data that would allow an investigator to believe a computing device may be compromised by malicious software or the like.

An example of a compromised device driver stack 111 is illustrated in FIG. 2. In this example, a mass storage device's driver stack is shown in the kernel space 104, and a legitimately installed anti-virus toolkit 130 has injected itself in the device driver stack 111, as has a malicious rootkit 132. The anti-virus toolkit 130 can monitor the data stream, analyzing it for signs of compromise, but the rootkit 132 will also monitor the data stream with the goal of stealthily modifying the data for the benefit of the attacker. If, in this example, the rootkit 132 is modifying the data stream before the anti-virus toolkit 130 has analyzed the data for signs of compromise, the anti-virus toolkit 130 may not be able to detect the rootkit 132.

Numerous solutions have been proposed to remedy this contamination problem. Anti-virus and Host Intrusion Prevention System ("HIPS") vendors attempt to uninstall the rootkit 132 dynamically or put measures in place to prevent the rootkit 132 from installing at all. These approaches become a classic cat-and-mouse game, as the rootkit 132 author simply installs at some other junction in the normal I/O path or subverts the prevention measure itself. Additionally, it is often the case that "whoever is there first" wins this battle, because all software that operates at the kernel space 104 has equal privileges. Some companies have put measures in place to protect critical components in chains of trust such as the device driver stack 111, but the rootkit 132 authors continue to circumvent existing measures and infect computing devices.

Thus, information security forensic investigators face the challenge of commanding physical hardware devices, including to obtain data from such devices, using OS components that may return compromised or otherwise untruthful data.

SUMMARY

The present inventive concept described herein remedies the aforementioned problems by providing a unique system and method operable to bypass a device driver stack and, consequently, also bypass potential malicious software compromises that may be adversely affecting that device driver stack, and to read from and/or write to an arbitrary physical hardware device location. The present inventive concept utilizes an alternative stack or crash dump I/O stack about which much less documentation exists relative to a device driver stack, and that is generally separate from the corresponding device driver stack. The crash dump I/O stack is less susceptible to malicious software compromises.

The present inventive concept also provides a system and method for extending the functionality of the crash dump I/O stack. The concept includes providing a system and method for utilizing the crash dump I/O stack to read from and write to a physical hardware device such as a mass storage device. The crash dump I/O stack is operable to function as a secondary or alternative data stack. The present inventive concept allows a user, such as an information security forensic investigator, to acquire uncompromised data from a computing device, and to write uncompromised data to a physical hardware device connected to the computing device.

The aforementioned may be achieved in an aspect of the present inventive concept by providing a method to circumvent malicious software in a computing device. The method includes identifying a dump port driver having a function, transmitting at least one command configured to obtain information related to an object, the object (i) in communication with the computing device and (ii) configured to execute an I/O command, instantiating a request block via the function; and/or causing the function to be executed for transmission of the I/O command to the object using the request block. The object may be a mass storage device, a physical hardware device, or a representation of the mass storage device or the physical hardware device such as a virtual machine. The physical hardware device may be or include a mass storage area.

The identification of the dump port driver may include searching a loaded module list for one of a plurality of names to identify the dump port driver for the mass storage device. The one of the plurality of names may contain a prefix. The prefix may be used for identification. The identification of the dump port driver may include verifying the identified dump port driver is correct by parsing or searching an export table.

The physical hardware device may be a mass storage device configured to contain debugging data for use during a critical system crash of the computing device. The debugging data may be core dump data. The at least one command may include a first command configured to obtain at least one of a target identification, path, and logical unit number and/or a second command configured to obtain a hardware register. The function may be at least one of a start in/out function and a DispatchCrb function. The method may further include allocating and/or initializing a memory space before execution of the function. The memory space may be identified as a dump port device extension. The dump port device extension may be discovered using an information leak. The memory space may be identified as a dump port device extension, and the dump port device extension may be discovered by calling to a function of the dump port driver and receiving the dump port device extension address. The request block may be initialized to specify a READ and/or a WRITE command.

The aforementioned may be achieved in another aspect of the present inventive concept by providing a method to circumvent malicious software in a computing device via a physical hardware device linked to a computing device. The method may include identifying a dump port driver, getting boot device information to enable transmission of an I/O command to a boot device, determining an entry point for a function for transmitting the command to the physical hardware device, instantiating and/or initializing a request block, and/or causing the function to be executed for transmission of the command to the physical hardware device using the request block. The method may include allocating and/or initializing a memory space before execution of the function. The memory space may be identified as a dump port device extension. The dump port device extension may be discovered using an information leak. The memory space may be identified as a dump port device extension. The dump port device extension may be discovered by calling to a function of the dump port driver and/or receiving a dump port device extension address. The physical hardware device may be a mass storage device. The request block may be initialized to specify a READ and/or WRITE command.

The aforementioned may be achieved in another aspect of the present inventive concept by providing a system to command a physical hardware device in communication with a computing device. The system may include a bypass command driver configured to identify a dump port driver, obtain boot device information, find a function, instantiate a request block, and/or call the function. The dump port driver may be in communication with the bypass command driver. The system may include a computer program with the function. The function may be configured to transmit a command to the physical hardware device.

The system may include a mini port driver in communication with the dump port driver, a bus driver in communication with the mini port driver and the dump port driver, a hardware bus in communication with the bus driver and/or a physical hardware device in communication with the hardware bus. The request block may be configured for use by the function in transmitting the command. The function may be configured for storage in the dump port driver and/or to transmit the command via the bus driver. The request block may include a CDB configured to be initialized with the command. The physical hardware device may be a mass storage device. The command may be a READ and/or a WRITE command. The physical hardware device may be a boot device. The system may include a memory space to send or receive data transferred as a result of execution of the command.

The aforementioned may be achieved in another aspect of the present inventive concept by providing a bypass command driver configured to cause data transfer in a computer system. The computer system may include a physical hardware device or an object representing the physical hardware device. The bypass command driver may be configured to identify a dump port driver in communication with the computer system and/or obtain boot device information. The computer system may include a computer program capable of transmitting a command to the physical hardware device, a mini port driver in communication with the dump port driver, a bus driver in communication with the mini port driver and/or the dump port driver, and/or a hardware bus in communication with the bus driver. The bypass command driver may include a set of instructions configured to be executed by the computer system.

Additional aspects, advantages, and utilities of the present inventive concept will be set forth in part in the description which follows and, in part, will be obvious from the description, or may be learned by practice of the present inventive concept.

The foregoing are intended to be illustrative and are not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

The present inventive concept is described in detail below with reference to the attached drawing figures, wherein.

Figure 1:
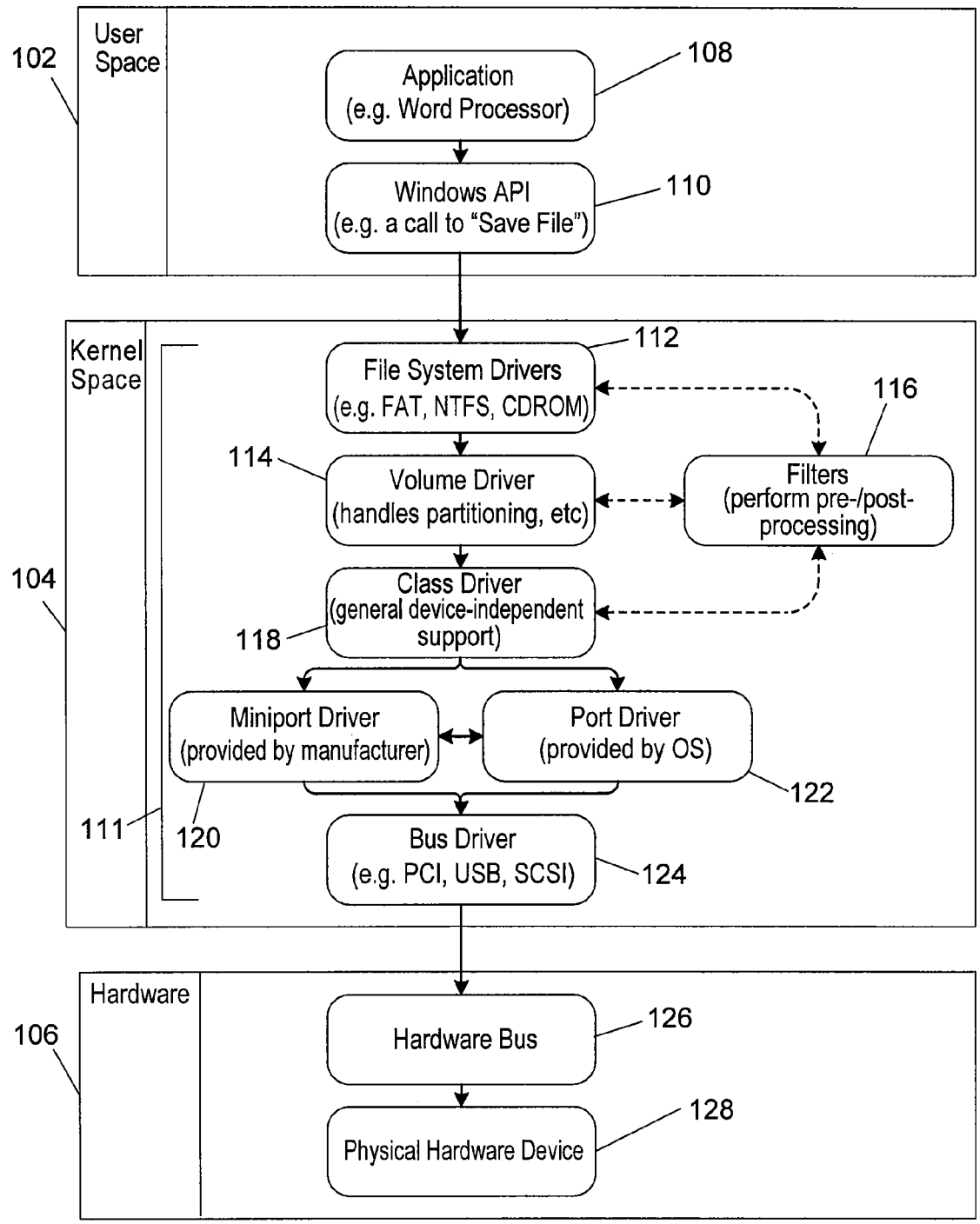
FIG. 1 is a flowchart illustrating an example of a traditional device driver stack for mass storage devices and associated user and hardware spaces.
Figure 2:
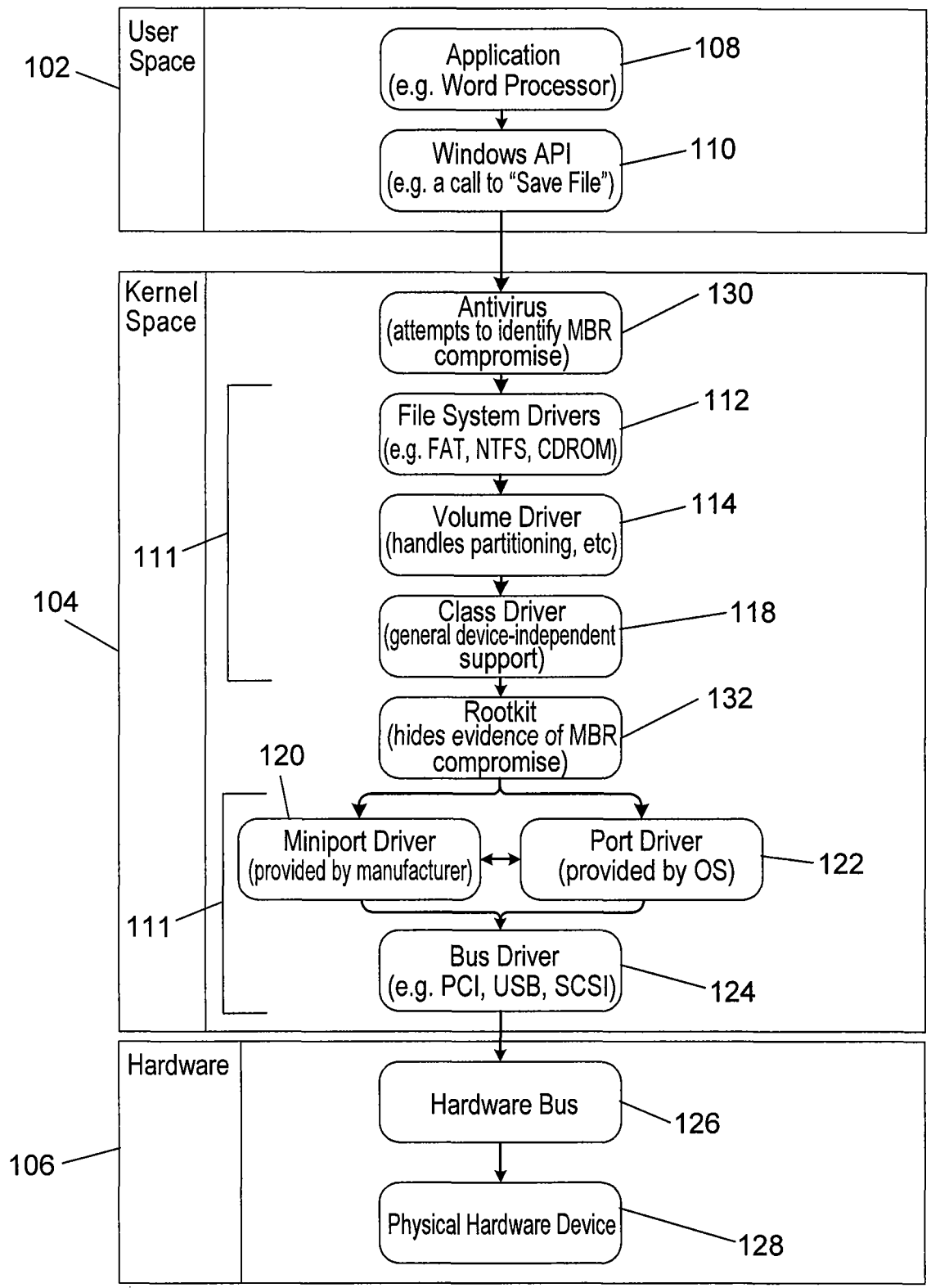
FIG. 2 is a flowchart illustrating an example of a traditional mass storage device driver stack that has been compromised, the mass storage device having associated user and hardware spaces.

The drawing figures do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

Figure 3:
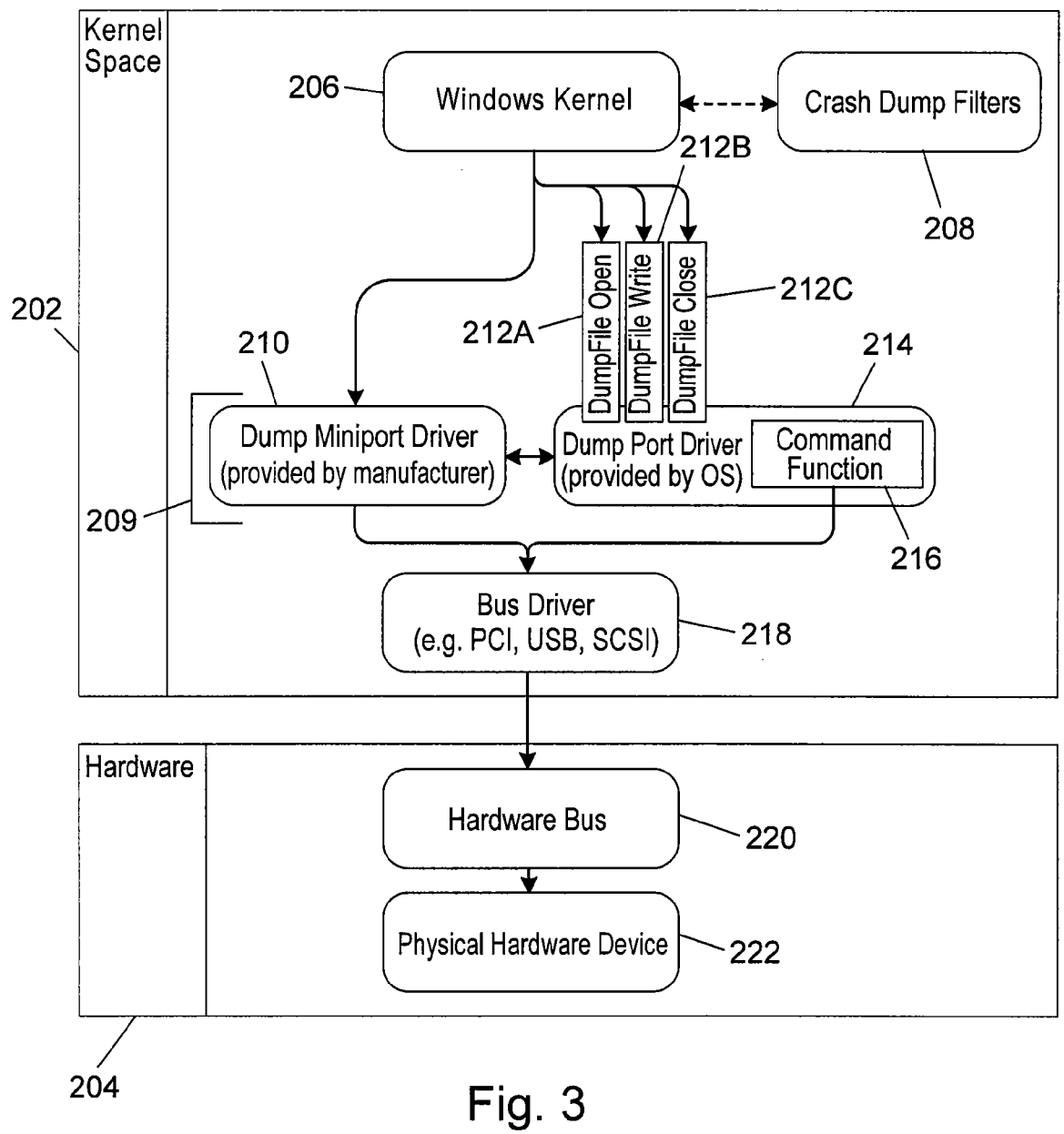
FIG. 3 is a flowchart illustrating a crash dump I/O stack of the present inventive concept with associated hardware space.
Figure 4:
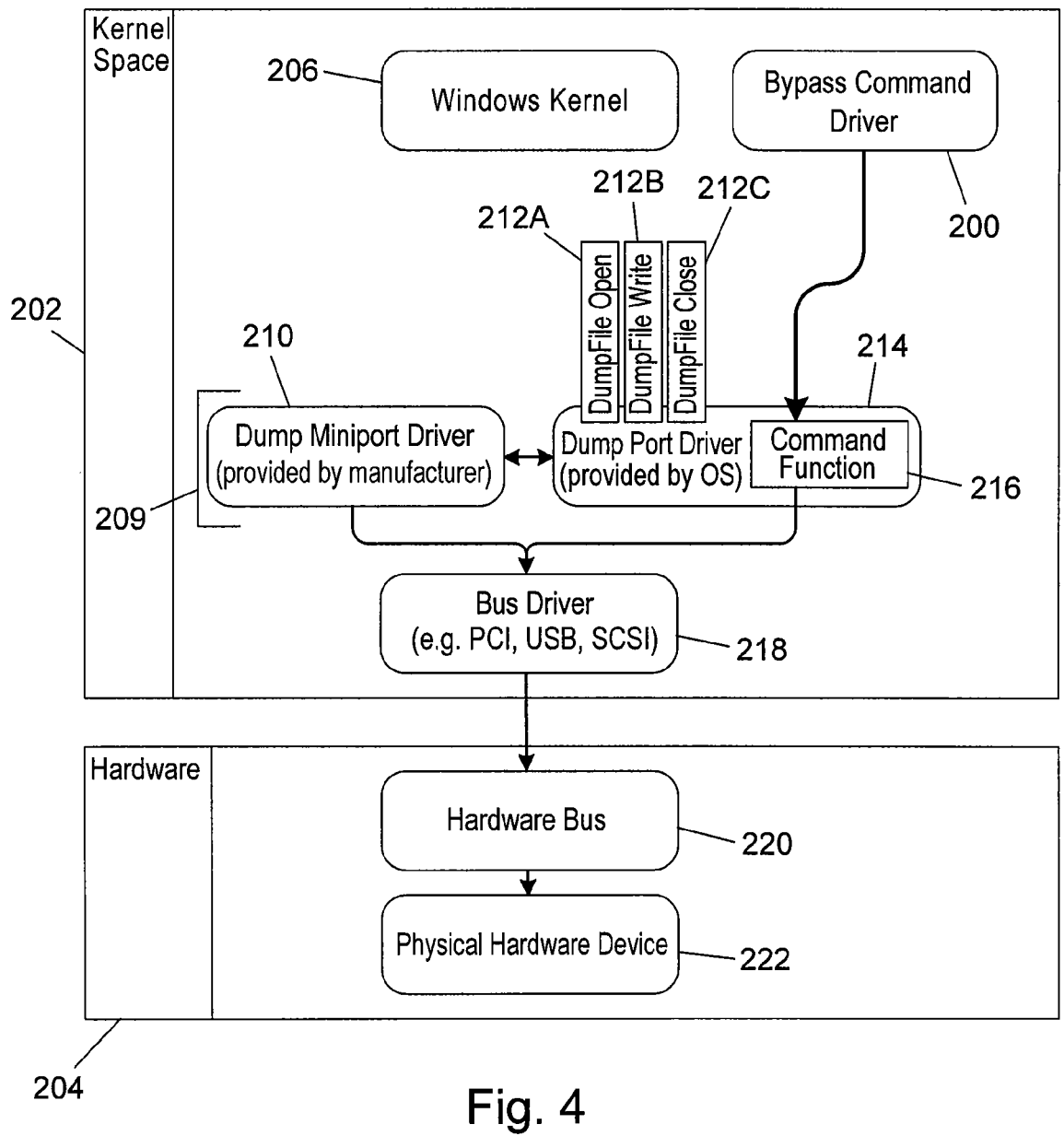
FIG. 4 is a flowchart illustrating the crash dump I/O stack of the present inventive concept of FIG. 3 with a bypass command driver for modified use.

Referring to FIGS. 3 and 4, the present inventive concept provides a system and method to use a bypass command driver 200 to bypass a compromised or potentially compromised device driver stack. The bypass command driver 200 is configured to communicate with a crash dump I/O stack 209 including a dump miniport driver 210 and a dump port driver 214, as well as with a bus driver 218 in kernel space 202, hardware bus 220, and a physical hardware device 222 in hardware layer 204.

Upon boot and initialization of a computing device, which can occur at power-on or after a hard reset of the computing device, an OS will identify the physical hardware device 222, such as, but not limited to, a mass storage device configured to record certain debugging data during a critical system crash. The physical hardware device may include or be a mass storage device or be capable of storing information. A mass storage device is a device which stores data in a persisting and machine-readable fashion. It is foreseen that the physical hardware device may be remotely linked to the computing device, for example via cloud computing methods, without deviating from the spirit of the present inventive concept.

After identification of the physical hardware device 222, the OS copies into memory the dump port 214 and the dump miniport 210 driver for the physical hardware device 222. After copying the dump port driver 214 and the dump miniport driver 210 for the physical hardware device into memory, entry points for the drivers can be called with special arguments. The dump port driver 214 can be called with a NULL value for the first argument and a pointer to a DUMP_INITIALIZATION_CONTEXT structure as the second argument. This second argument may contain data necessary to write debugging information to disk when a crash dump I/O stack is used. The dump miniport driver can be called with two NULL arguments to indicate it is operating in crash dump mode. Crash dump mode limits the hardware to synchronous processing.

During a critical crash, the crash dump I/O stack operates to write out debugging data to the physical hardware device without reading data. The crash dump I/O stack does not read data during a critical crash because the computing device is rebooted and all volatile information is lost. The OS modifies the dump port driver to handle I/O autonomously, which causes a device driver stack to be bypassed. The dump miniport driver is a copy of a manufacturer-supplied dump miniport driver and is dynamically linked to the dump port driver. In a crash, the OS will call the dump port driver. Then the dump port driver calls the dump miniport driver to handle all I/O operations.

The bypass command driver 200 configures or otherwise enables the crash dump I/O stack 209 to communicate commands to the physical hardware device 222 regardless of whether a crash has occurred. The bypass command driver 200 is configured to initialize and use the crash dump I/O stack 209 independent of the OS. The bypass command driver 200 can be loaded by, for example, employing an administrator account, creating a service, assigning the bypass command driver 200 to that service, and starting the service. Following loading, a command may be issued and the bypass command driver 200 may cause, for example, reading from and/or writing to a physical hardware device 222 using the crash dump I/O stack 209.

The present inventive concept advantageously utilizes the crash dump I/O stack 209 via the bypass command driver 200 because it has fewer malicious software compromises relative to other stacks such as, but not limited to, the device driver stack. This is due in part to the fact that the crash dump I/O stack 209 is typically only utilized when the computing device is crashing. The crash dump I/O stack 209 is largely hidden and, therefore, much less documentation exists for it relative to other stacks such as, but not limited to, the device driver stack, thereby presenting a higher degree of technical difficulty in attempting to compromise the crash dump I/O stack 209 relative to other stacks. Additionally, the crash dump I/O stack 209 is initialized very early in the boot process of the computing device relative to other stacks such as, but not limited to, the device driver stack, thereby providing a smaller time period and lesser opportunity for malicious software to inject itself relative to initialization of other stacks.

FIG. 4 illustrates the bypass command driver 200 in communication with the physical hardware device 222. It is foreseen that the physical hardware device 222 may be a mass storage device without deviating from the scope of the present inventive concept. It is further foreseen that the physical hardware device 222 may be a plurality of physical hardware devices without deviating from the scope of the present inventive concept. The physical hardware device 222 can be controlled via the bypass command driver 200 in communication with a crash dump I/O stack 209. In operation, the dump port driver 214 implements transport protocols such as SCSI and IDE, and interfaces with higher-level drivers so that the higher-level drivers need not take account of protocol-dependent details. In FIG. 4, the dump port driver 214 is illustrated in communication with the bypass command driver 200, and also with the dump miniport driver 210 which implements a hardware-dependent interface with the hardware bus 220 of the physical hardware device 222.

The bypass command driver 200 enables the crash dump I/O stack 209 to read from and/or write to the physical hardware device 222 by using a command function 216 that is not documented in the typical OS documentation to provide read and/or write communication between the physical hardware device 222 and the bypass command driver 200. The bypass command driver 200 also enables initialization of one or more various sparsely-documented and/or undocumented internal driver structures to enable extended functionality, such as read and/or write functionality of the crash dump I/O stack 209 to read and/or write to a physical hardware device 222.

Figure 5:
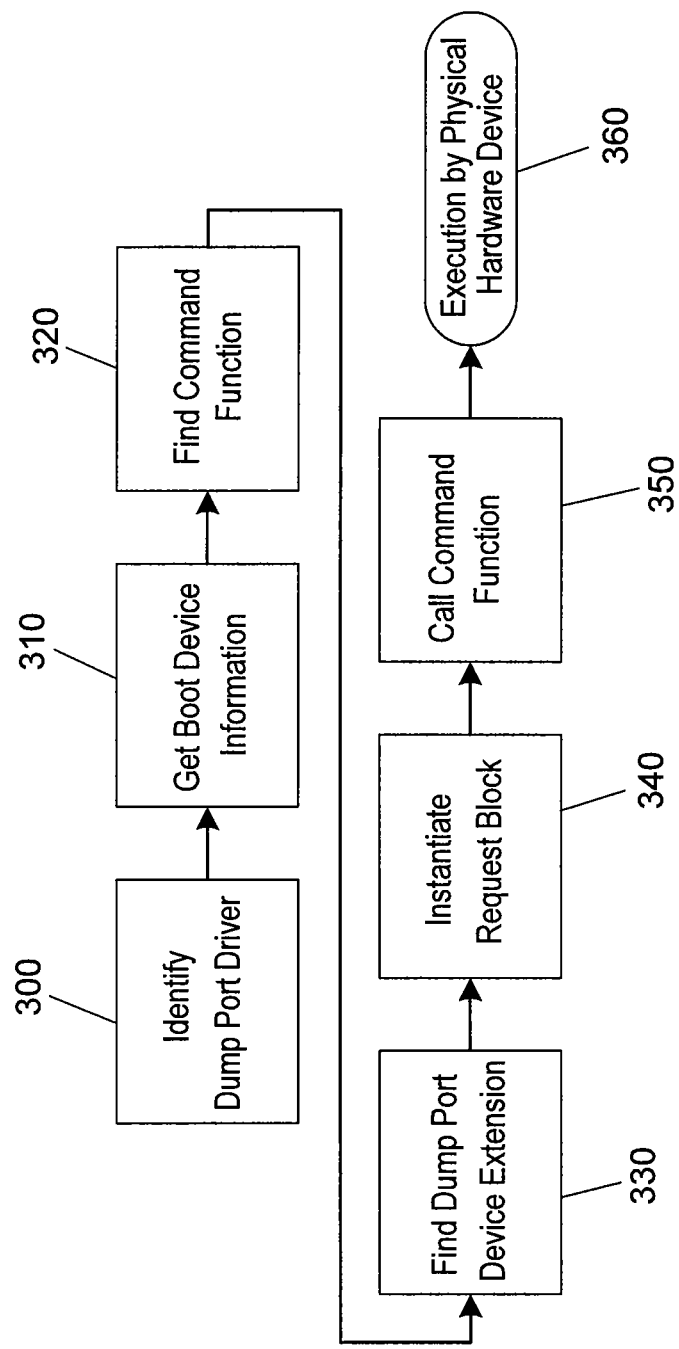
FIG. 5 is a diagram illustrating a method for using the crash dump I/O stack of the present inventive concept to read from and/or write to a mass storage device.

Turning to FIG. 5, operation 300 can include a process for identifying the dump port driver 214. The names and entry points of the dump port driver 214 and the dump miniport driver 210 can be identified by obtaining and searching a loaded module list for names beginning with the "dump_" prefix. Any such driver, including those named "dump_diskdump", "dump_dumpata", "dump_scsiport", "dump_ataport" or "dump_storport" is the dump port driver 214. Any remaining driver prefixed with "dump_" is either the dump miniport driver 210 or a crash dump filter driver. The dump miniport driver 210 name can be obtained by opening a "handle" to a device object structure ("device object"), such as \Device\Harddisk0\DR0, that represents the boot device using application programming interfaces ("API"). The device object contains a pointer to a list of attached device objects in the NextDevice field. The list is "walked" using the IoGetLowerDeviceObject API until the lowest device object is reached. The lowest device object contains the name of the dump miniport driver 210 in the device_object.driverobject. drivername field. The full name of the dump miniport driver 210 can be obtained by prepending the string "dump_" to the name of the lowest device object.

In computing devices, there can be a second way to identify the dump port driver 214 and the dump miniport driver 210 through the IOCTL_SCSI_GET_DUMP_POINTERS command. If this command is successfully issued to a boot device, a structure of documented type DUMP_POINTERS_EX is returned. The last field in the structure is named "DriverList" and contains a null-separated list of the drivers in the dump stack, including the dump port driver 214 and the dump miniport driver 210.

To verify the correct drivers are selected as the dump port driver 214 and the miniport driver 210, the export table can be parsed for known exports.

The default boot device is usually a mass storage device, which can be the default destination for crash dump output.

An operation 310 includes a process of obtaining boot device information. The boot device information can be obtained by communicating directly with the boot device using the APIs. A "handle" may be opened to a device object that represents the physical hardware device that, in this case, is the boot device. Two commands can be sent to the device object to retrieve information necessary to transmit I/O commands to the boot device. In an embodiment, the first command can be IOCTL_SCSI_GET_ADDRESS to obtain the Target Id, Path and LUN settings for the physical hardware device for use in building the request block. The second command can be IOCTL_SCSI_GET_DUMP_POINTERS to obtain register mapping information and hardware port configuration information used by the dump miniport driver 210 to complete the request block. All port drivers, regardless of underlying transport technology (IDE or SCSI) will respond to these requests with the appropriate information. After the correct drivers have been identified, their entry points can be called using arguments such as, but not limited to the first argument and the second argument previously discussed.

The command function 216 can be a start in/out or "StartIo" function, or a DispatchCrb function. The command function 216 is used to execute the request block. The request block may be built using hardware-dependent information, including information obtained through the operations illustrated in FIG. 5. The request block may then be sent to the dump port driver 214, which passes it to the dump miniport driver 210.

For SCSI devices, the command function 216 is the StartIo function which is used to execute a SCSI Request Block ("SRB"). A StartIo function is used for I/O operations on SCSI physical hardware devices. The StartIo function is a macro instruction for low-level device access for I/O commands. According to the present inventive concept, the StartIo function in the dump port driver 214 operates independently of the OS. For IDE devices, the command function 216 is the DispatchCrb function, which is used to execute an IDE Request Block ("IRB"). The dump port driver 214 employs the DispatchCrb function in place of the StartIo function. The DispatchCrb function uses a single channel extension argument whereas the StartIo function uses a single SCSI Request Block argument.

As illustrated in FIG. 5, the command function 216 can be found during an operation 320, and later called by an operation 350. The command function 216 is not exported and thus must be discovered, including, in an embodiment, by examining the dump port driver 214 internal data structures. The command function 216 can be discovered in an operation 320 by searching the code section of the dump port driver 214 image in memory for a known sequence of bytes. For example, a byte signature identifying the command function 216 may be found with reference to a particular OS, and the command function 216 entry point may be discovered by subtracting an offset from the located byte signature.

The bypass command driver 200 is operable to allocate memory space that can be passed between and used by both the dump port driver 214 and the mini port driver 210 and that represents the request block to be sent, such allocation may occur before execution or initiation of the command function 216. It is foreseen, however, that the bypass command driver 200 may allocate and/or initialize required memory space after executing or otherwise initiating the command function 216 without deviating from the scope of the present inventive concept. The memory space can be identified as the "dump port device extension" and is not an exported variable. Thus, it may be discovered by an operation 330 which may exploit an "information leak." An information leak is the unintentional exposure of internal data to outside sources. As used by the present inventive concept, the information leak can provide a memory pointer to the dump port device extension.

For example, for a computing device having an OS sold under the trademark Windows® having a x86 architecture and operating with a SCSI protocol, a call to a "DiskDumpOpen" function of the dump port driver 214 returns with a dump port device extension address stored in the "ecx" CPU register. If the OS has a x64 architecture and operating with a SCSI protocol, the same function is called which returns with a dump port extension address stored in the "rdx" register. In an IDE protocol x86, a call to a "IdeDumpOpen" function returns with a device extension address stored in the "ecx" register. In an IDE protocol x64, the same function is called which returns with a dump port device extension address stored in the "rcx" register.

Having obtained the device extension address, it is now possible to allocate and initialize the memory space in preparation for sending the request block. The request block will read data from the memory space and write it to the physical hardware device 222 or will read data from the physical hardware device 222 and write it to the memory space.

FIG. 5 further illustrates an operation 340 that can include a process of instantiating a request block. In the operation 340 with the SCSI transport protocol, a request block known as a SCSI Request Block ("SRB") can be instantiated. The SRB functions as a "wrapper" around a command for reading from and/or writing to the physical hardware device 222, and, following instantiation, specifies the location of the memory block, its length, and other data describing the contents of the block. "Wrapper", as used herein, means a containing structure that holds in one field, such as the CDB field, a device-specific command such as a READ or WRITE command that conforms to a standard such as the SCSI standard, and that holds in additional fields other OS-specific data that is required for completing the request. "Instantiation," as used herein, means to create a request to allocate a block of memory and to fill that memory block with data.

The SRB also can be initialized. As part of the process of initializing the SRB, its CDB may be initialized to specify a READ command, the location of the memory block, and the amount of data to be read from the mass storage device.

The CDB data structure is a common standard used by all mass storage device manufacturers, comprising a device command and parameters. Therefore, it is applicable to all devices that operate using the SCSI transport technology.

An operation 350 can include the process of calling the command function 216. For SCSI devices, the StartIo function is used as the command function 216, and the StartIo function can be called with the SRB as a parameter to the call. The StartIo function can be executed to extract the CDB and send it to the miniport device driver 210. The physical hardware device 222 can perform an operation 360 to execute the READ command and write the data to the specified memory block.

Alternatively, the CDB can be initialized to specify a WRITE command, the location of a memory block containing data to be written, and the size of the memory block. When the bypass command driver 200 is employed with a SCSI device, the StartIo function can be called with the SRB as the parameter to the call. This causes the CDB to be extracted and sent to the miniport device driver 210. The physical hardware device 222 executes the WRITE command by performing the operation 360, retrieves the referenced data from the specified memory block, and writes that data to the physical hardware device 222.

In an application having an IDE device, the present inventive concept may utilize the crash dump I/O stack 209 to command the physical hardware device 222. In such an application, the operation 340 may be undertaken by allocating a device extension structure ("CRB") with a correct offset based on the computing device's OS, storing a pointer to a callback function in the CRB for use following completion of the execution operation 360 by the physical hardware device 222, allocating and filling the IRB in the CRB, and allocating an argument describing parameters of the command. The operation 350 may then include sending the CRB to the command function 216, which causes execution 360 of the command by the physical hardware device 222.

In this manner, the present inventive concept is operable to permit a user such as, but not limited to, an information security forensic investigator or the like, to bypass malicious software that contaminates or is at least capable of contaminating a device driver stack, thereby increasing the likelihood that retrieved and written data is not corrupted by malicious software.

The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The present inventive concept may include initializing the CDB with commands and parameters other than those used for READ and WRITE. Command support for these commands varies dependent on the physical hardware device.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Using the present inventive concept, any number of physical hardware devices may be commanded via a crash dump I/O stack and/or a function capable of commanding a physical hardware device to read and/or write. The example explained above describes a present inventive aspect involving a mass storage device. The same approach could be applied against different physical hardware devices capable of executing such commands.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method to circumvent malicious software in a computing device, the method comprising the steps of:
    identifying a dump port driver having a function;
    transmitting at least one command configured to obtain information related to a physical hardware device, the physical hardware device (i) in communication with the computing device and (ii) configured to execute an I/O command;
    exploiting data from an information leak to (i) locate a dump port device extension and (ii) initialize a memory space; and
    causing the function to be executed for transmission of the I/O command to the physical hardware device.

2. The method according to claim 1, wherein the physical hardware device includes a mass storage area.

3. The method of claim 2, further comprising the step of:
    initializing a request block to specify a READ command or specify a WRITE command.

4. The method according to claim 1,
    wherein,
        the physical hardware device is a mass storage device, and
        the identification of the dump port driver includes searching a loaded module list for one of a plurality of names to identify the dump port driver for the mass storage device.

5. The method according to claim 4, wherein the one of the plurality of names contains a prefix.

6. The method according to claim 4, wherein the identification of the dump port driver includes verifying the identified dump port driver is correct by parsing an export table.

7. The method according to claim 1, wherein the physical hardware device is a mass storage device configured to contain debugging data for use during a critical system crash of the computing device.

8. The method according to claim 7, wherein the debugging data is core dump data.

9. The method according to claim 1, wherein the at least one command includes (i) a first command configured to obtain at least one of a target identification, a path, and a logical unit number, and (ii) a second command configured to obtain a hardware register.

10. The method according to claim 1, wherein the function is at least one of a start in/out function and a DispatchCrb function.

11. The method of claim 1,
    wherein,
        the data is a memory pointer to the dump port device extension.

12. The method of claim 1,
    wherein,
        the dump port device extension is located by calling to a function of the dump port driver and receiving the dump port device extension address.

13. A method to circumvent malicious software in a computing device via a physical hardware device linked to a computing device, the method comprising:
    identifying a dump port driver;
    getting boot device information to enable transmission of an I/O command to a boot device;
    determining an entry point for a function for transmitting the command to the physical hardware device;
    exploiting data from an information leak to (i) locate a dump port device extension and (ii) initialize a memory space; and
    causing the function to be executed for transmission of the command to the physical hardware device.

14. The method of claim 13,
    wherein,
        the data is a memory pointer to the dump port device extension.

15. The method of claim 13,
    wherein,
        the dump port device extension is located by (i) calling to a function of the dump port driver and (ii) receiving a dump port device extension address.

16. The method of claim 13,
    wherein,
        the physical hardware device is a mass storage device, and
        further comprising the step of initializing a request block to specify a READ command or specify a WRITE command.

17. The method of claim 13,
    wherein,
        the data is from an internal source that is unintentionally exposed to an external source.

18. A system to command a physical hardware device in communication with a computing device, the system comprising:
    a bypass command driver configured to identify a dump port driver, obtain boot device information, find a function, locate a dump port device extension and initialize a memory space, and call the function, the dump port driver in communication with the bypass command driver;
    a computer program comprising the function, the function configured to transmit a command to the physical hardware device;
    a mini port driver in communication with the dump port driver;
    a bus driver in communication with the mini port driver and the dump port driver;
    a hardware bus in communication with the bus driver; and
    a physical hardware device in communication with the hardware bus,
    wherein,
        the bypass command driver is configured to locate the dump port device extension using data obtained from an information leak.

19. The system of claim 18, wherein the function is configured (i) for storage in the dump port driver and (ii) to transmit the command via the bus driver.

20. The system of claim 18, further comprising:
    a request block that includes a command descriptor block configured to be initialized with the command.

21. The system of claim 18,
    wherein,
        the physical hardware device is a mass storage device, and
        the command is a READ or a WRITE command.

22. The system of claim 18, wherein the physical hardware device is a boot device.

23. The system of claim 18, further comprising:
    a memory space to send or receive data transferred as a result of execution of the command.

24. The system of claim 18,
    wherein,
        the bypass command driver is configured to execute an operation to exploit the information leak.

25. The system of claim 18,
wherein,
the operation to exploit the information leaked is executed by after executing an operation to obtain boot device information.

26. The system of claim 18,
wherein,
the data is from an internal source that is unintentionally exposed to an external source.

27. A method to circumvent malicious software in a computing device, the method comprising the steps of:
identifying a dump port driver having a function;
transmitting at least one command configured to obtain information related to a physical hardware device, the physical hardware device (i) in communication with the computing device and (ii) configured to execute an I/O command;
locating a dump port device extension using an information leak; and
causing the function to be executed for transmission of the I/O command to the physical hardware device,
wherein,
the information leak is data from an internal source that is unintentionally exposed to an external source.

* * * * *